Dec. 3, 1963   A. P. ADAMSON   3,112,611
ROCKET MOTOR EMPLOYING A PLUG TYPE NOZZLE
Filed July 21, 1958   2 Sheets-Sheet 1
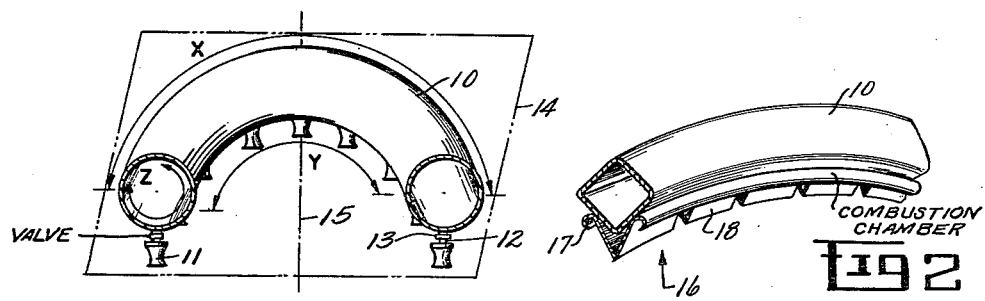
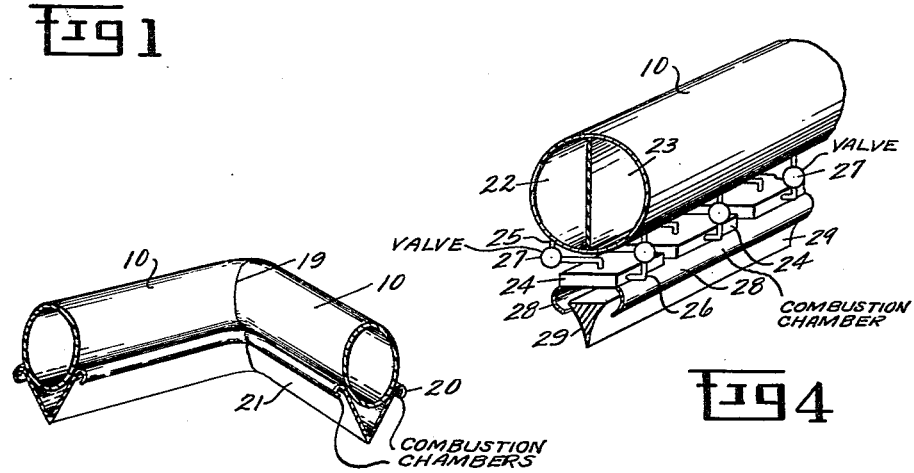
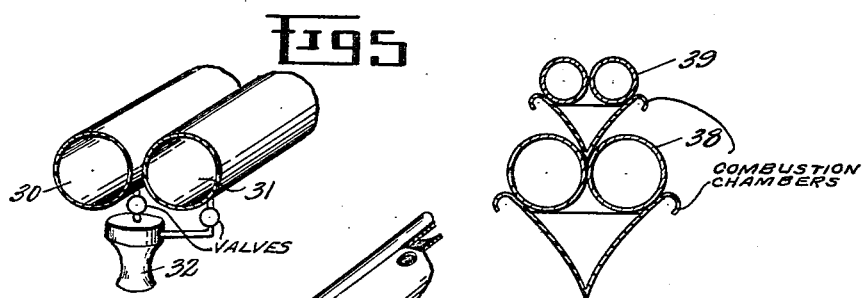
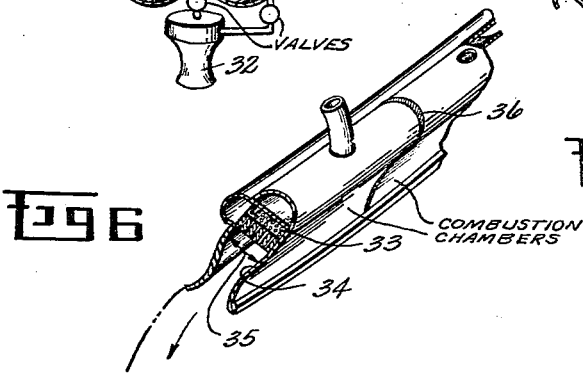
INVENTOR.
ARTHUR P. ADAMSON
BY John F. Cullen
ATTORNEY—

Dec. 3, 1963  A. P. ADAMSON  3,112,611
ROCKET MOTOR EMPLOYING A PLUG TYPE NOZZLE
Filed July 21, 1958  2 Sheets-Sheet 2
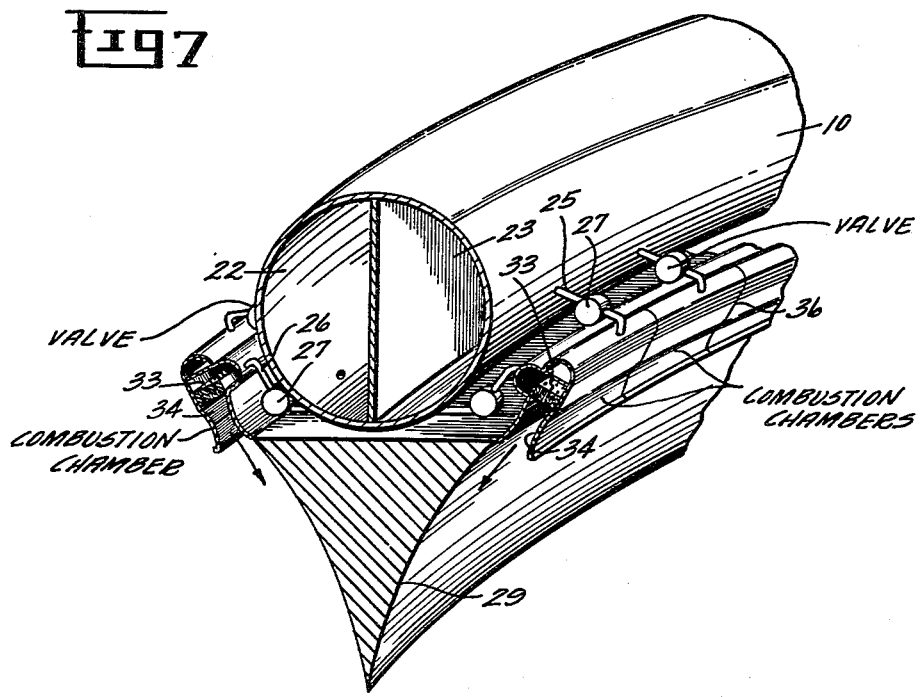
INVENTOR.
ARTHUR P. ADAMSON
BY
John F. Cullen
ATTORNEY

United States Patent Office 3,112,611
Patented Dec. 3, 1963

3,112,611
ROCKET MOTOR EMPLOYING A PLUG TYPE NOZZLE
Arthur P. Adamson, Cincinnati, Ohio, assignor to General Electric Company, a corporation of New York
Filed July 21, 1958, Ser. No. 749,709
10 Claims. (Cl. 60—35.6)

The instant invention relates to a rocket motor and, more particularly, to a rocket motor in the general shape of a toroid capable of producing thrust of the order of one million pounds and upwards.

In present-day rockets and in rockets of the future, there is a need for vehicles that develop thrust in the order of millions of pounds. The main problem of such high thrust rockets is that of arriving at a rational design consistent with the present technological state of the art. Conventional rockets normally employ the well-known DeLaval nozzle in which the thrust is proportional to the area of the throat. Such conventional rockets normally use a thrust chamber which employs an injector, a combustion chamber, and the DeLaval nozzle. As the thrust goes up, the diameter of the throat goes up. The difficulty in designing larger rockets of the conventional type arises in scaling up such conventional types to increase the thrust. The use of the plug nozzle is known and also requires an increase in diameter as the thrust is increased. Very high thrust engines of a million pounds or more require very large injectors ranging from three feet in diameter up to thirty or thirty-five feet in diameter for engines in the fifty million pound class using a single scaled-up injector.

In rockets and in rocket propulsion there is a phenomenon which is called combustion instability. This phenomenon produces violent flow oscillations in the combustion chamber which either burns out the chamber or tears it apart in a matter of seconds. These fluctuations run into several hundred pounds per square inch pressure change. In order for stable combustion to occur, it is necessary to have practically uniform pressure distribution and uniform combustion across the injector. The larger the diameter of the injector becomes, the more severe the combustion instability is likely to become. As a result, with a very large injector, it is practically impossible to obtain the uniform pressure and combustion distribution required and to predict the combustion instability phenomenon. The present status of the rocket art is such that no predictable, quantitative scaling law exists to obtain any useful and reliable information on the combustion instability. For example, if the diameter is doubled, it does not mean that the combustion instability or the fluctuations will double nor will they follow any predictable pattern. In nearly every instance in which a new thrust chamber has been developed, combustion instability difficulties have been experienced resulting in a tedious, lengthy, costly, trial and error development program. Thus, it is impossible, with present technology, to scale up a conventional design and have any knowledge of what it will do in the larger sizes without the long and costly development program. Consequently, no reliability can be placed on scaling up a conventional design.

A second approach to obtain extremely high thrust rockets has been to bundle together existing and known motors or chambers to provide the required thrust. This concept suffers from complexity, in requiring complicated control system to maintain uniform performance. In addition, this concept severely limits the growth potential of the propulsion system since there is a practical limit as to how many engines or motors can be bundled together.

In the development of rockets, the testing program is an extremely important phase. Since there is no scaling up criteria, all the testing must be done on the full scale unit because sub-scaling of the testing has no meaning in view of the combustion instability problem. In considering a fifty million pound thrust unit, it is necessary to consider around two hundred thousand pounds of propellant per second. Even at ten cents a pound, this means that the propellant cost will be twenty thousand dollars per second. If the testing thus must be done on a full size unit, the expense becomes prohibitive.

In the conventional rockets, directional control is normally obtained by gimbaling the motor and the gimbaling loads and thrust transmission loads get very large as the thrust goes up. The mechanism that transmits the thrust from the motor to the vehicles not only goes up in diameter directly with the thrust, but it also becomes longer and, as a result, the weight of the thrust transmission mechanism goes up non-linearly as the thrust goes up resulting in the transmission mechanism becoming an appreciable portion of the propulsion system in those systems of a million pounds thrust and above.

Inasmuch as present technology does not permit the scaling up concept, a new concept is required that permits the use of existent technology in order to obtain a rocket motor that is practical for very high thrust—of up to fifty millions pounds or higher. Such a concept is disclosed and claimed in application Serial Number 749,744 filed July 21, 1958, and assigned to the assignee of the instant invention. Said application discloses a multiple or cellular arrangement using a common plug nozzle.

The main object of the present invention is to provide a rocket motor which is practical for thrusts of one million pounds and above and is not completely dependent on the plug nozzle.

Another object is to provide such a motor which utilizes existent technology to obtain thrusts of millions of pounds without encountering the problem of combustion instability.

A further object is to provide such a motor which is practical for thrusts of mililons of pounds and utilizes known units which can be tested on a small scale and are completely reliable so that the final assembly avoids the prohibitive cost involved in full scale testing.

Another object is to provide such a motor which may use a single thrust chamber or a plurality of thrust chambers in a cellular concept but still maintains them below critical dimensions to avoid the combustion instability problem.

Briefly stated, my invention discloses a rocket motor which uses a propellant carrying member, generally annular and constructed in the shape of a modified toroid such as the general shape of a doughnut. Supported adjacent the periphery of the toroid, generally along its lower surface (if the motor is assumed to be going straight up) is a thrust chamber assembly which may comprise a complete annulus or may be broken into a plurality of assemblies of a cellular arrangement each of which is controlled individually and each of which is not subject to combustion instability. Control is obtained by selectively directing propellant to each thrust chamber assembly which may comprise any suitable assembly commonly used. The invention is applicable to mono-propellants or to the conventional fuel and oxidizer propellants in which case the annular chamber may be partitioned or dual chambers may be used. In addition, the rocket motor may be stacked to provide several stages, each stage being substantially identical to the previous stage.

While the specification concludes with claims particularly pointing out and distinctly claiming the subject matter which I regard as my invention, it is believed the invention will be better understood from the following description taken in connection with the accompanying drawing in which:

FIGURE 1 is a partial perspective view illustrating the rocket motor with conventional DeLaval thrust chamber assemblies;

FIGURE 2 is a modified version, similar to FIGURE 1, showing a toroid of different cross-sectional area and utilizing individual plug nozzles;

FIGURE 3 is a modified version, similar to FIGURE 1, showing a modified toroid using a continuous combustion chamber assembly and continuous plug nozzle;

FIGURE 4 is a partial perspective view with parts exaggerated showing a partitioned propellant storage member and using individually controlled thrust chamber assemblies of the plug nozzle type;

FIGURE 5 is a view, partially in perspective, showing dual propellant storage means and individually controlled DeLaval thrust chamber assemblies;

FIGURE 6 is a partial perspective view illustrating the combustion chamber cellular arrangement used in FIGURES 2–4;

FIGURE 7 is a partial sectional perspective view illustrating the combustion chamber of FIGURE 6 as employed in the embodiment of FIGURE 4; and FIGURE 8 is a cross sectional view showing the stacked arrangement of a dual propellant storage modification as shown in FIGURE 5 and a continuous plug nozzle or individual plug nozzles as shown in FIGURES 3 and 2 respectively.

Referring first to FIGURE 1, there is shown a rocket motor in accordance with the instant invention, which motor may act as the complete vehicle or may have a pay load mounted on top of it in any suitable manner. The motor consists of a propellant carrying annular member 10 in the shape of a modified toroid. In this connection, and as used in the claims, the term "modified toroid" has been selected to cover those figures which are generally similar but may depart from the exact geometrical definition normally used for a toroid. For example, FIGURE 1 illustrates a doughnut-shaped motor. However, it will be appreciated that the cross-sectional view of the doughnut may be any shape such as circular in FIGURE 1, substantially square as in FIGURE 2, or elliptical as in FIGURE 3, or any other suitable cross-sectional shape whether composed of curved or straight lines. In addition, it is not necessary that the toroid be round as viewed from above, but may take suitable shapes such as an ellipse as viewed from above partially shown in FIGURE 2, or may be in sections of any suitable number as shown in FIGURE 3. Also, the term "annular" is intended to connote the generally closed form, whether circular or not, with the hole in the middle. Thus, the strict definition of annular is not intended in the use of the term herein. The terms "modified toroid" and "annular" as used in the specification and claims are intended to cover all such obvious modifications, whether curved as shown or mere cylinders or tubes as shown in FIGURE 4 which can be thought of as a rocket motor itself without being completely closed upon itself.

In the preferred form, member 10 will be closed normally upon itself in the general shape of a doughnut. In order to obtain thrust, a series of thrust chamber assemblies 11 are mounted along a major periphery of the toroid which may be the bottom surface as shown or one of the side surfaces if desired. The term "major periphery" defines any periphery of the toroid symmetrical to the toroid axis and is to be distinguished from a "minor periphery" which defines the distance around the cross-section of the toroid. In FIGURE 1, examples of major peripheries are shown as X and Y while the minor periphery is shown as Z. Another example of a major periphery would be the distance along the bottom of the toroid through the centers of assemblies 11. The toroid axis, as used above, is the axis passing through the center of the hole in the "doughnut" and which is perpendicular to the plane of maximum cross-sectional area as defined below. As shown, the rocket motor illustrated in FIGURE 1 has a plurality of the DeLaval nozzles to comprise the individual thrust chambers assemblies, each of which comprises an injector, combustion chamber and nozzle as is well known. In addition, FIGURE 1 is illustrated as a mono-propellant rocket. Each thrust chamber assembly 11 is connected to the propellant carrying member 10 along a major periphery by suitable piping 12 having valve means 13 for selectively directing propellant to the thrust chamber assemblies. The thrust chamber assemblies may be supported in any suitable fashion such as directly from member 10.

It will be noted that the plane of maximum cross-sectional area of the annular member is shown as plane 14 in phantom and that the thrust produced by assemblies 11 is substantially perpendicular to this plane along the line 15. Vector control is obtained by selectively actuating the assemblies 11. If desired, a pay load may be carried on top of member 10 in any suitable manner if the motor as shown is not to be considered the pay load.

Referring next to FIGURE 2, there is shown a modified version of the same general concept wherein the propellant carrying member 10 is of different cross sectional shape. Individual combustion chamber assemblies of a different version, generally indicated at 16, may be employed. These assemblies consist of individual injectors as shown at 33 in FIGURE 6 and combustion chambers 17 exhausting into plug nozzles 18 below and contiguous to chambers 17. Any suitable shape plug may be used, such as straight sided as shown in FIGURE 2 or some exponential shaped curve as shown in FIGURE 4. Piping, similar to that shown in FIGURE 1, with control valve means, is used to selectively direct propellant to each assembly. Combustion chamber 17 may be common to the entire toroid along a major periphery as shown or may be individual for each nozzle 18. The selective directing of propellants to each assembly in any desirable manner controls the thrust and direction.

Referring now to FIGURE 3, a modified version of the same general concept is shown in which propellant carrying members 10 may be joined together at 19 to form an irregular or modified toroid as viewed from above. In this modification, at least one thrust chamber assembly comprising an injector as shown in FIGURE 6, a combustion chamber 20, and a continuous plug nozzle 21, are employed to exhaust from a common plane cutting through the toroid. Thus, in an irregularly-shaped toroid as illustrated in FIGURE 3, the combustion chambers are all in the same plane. This common plane, if the vehicle is designed to go straight up, will be a major periphery surface along the bottom as shown and the nozzle 21 is disposed below and contiguous to the combustion chamber assembly. This modification uses a single continuous injector—a strip cellular injector as in FIGURE 6, which can be kept below critical limits to avoid the combustion instability problem since no large diameter injector is required. In addition, the cross sectional area of the modified toroid may be elliptical as shown.

Referring now to FIGURE 4, a partial view of still another modification is shown wherein the propellant carrying member 10 is partitioned into fuel and oxidizer sections 22 and 23 each of which supply injector 24 through lines 25 and 26 with appropriate valving 27 for selective control of the delivery of propellant. The injector 24, which is exaggerated and normally takes the form as shown in FIGURE 6, supplies combustion chamber 28 which may be individual to each injector as shown or may be continuous as shown in FIGURE 3 and which, in turn, directs the exhaust into plug 29 which may be individual to each injector as shown in FIGURE 2 or may be continuous as shown.

Referring now to FIGURE 5, there is shown a modification employing separate or dual propellant storage means in lieu of the partitions and in which fuel in stored in one member 30 and oxidizer in the other member 31. In this modification, the selective control means connects the storage members with a conventional DeLaval nozzle 32 for illustration although a plug nozzle may be used. Again, individual units 32 are used around the periphery of the storage members to depend therefrom and may be supported from one or more of the storage members if desired. The annular propellant carrying members 30 and 31 may be concentrically arranged as shown or may take any suitable arrangement of a modified toroid.

Referring to FIGURES 6 and 7, there is shown a typical combustion chamber assembly that forms one of the cells in the cellular concept. The assembly consists of a strip injector 33 with its combustion chamber 34. These linear strips 33 and their associated combustion chambers can be kept within critical limits to avoid combustion instability. Thus, by keeping the distance 35 small, any instability in this direction can be suppressed. Similarly, any instability arising in the peripheral direction can be suppressed if required by the placing of suitable baffles 36 to divide the combustion system into cells. As shown, the combustion chamber assemblies cooperate with a plug nozzle having a curved surface 29 which may be continuous as nozzle 21 in FIGURE 3 or in sections as nozzle 18 in FIGURE 2 to form the thrust chamber assemblies. If combustion instability is not a problem in the peripheral direction, a continuous strip may be used as in FIGURE 3. It can be seen that this is merely another arrangement of the individual combustion assemblies as shown in FIGURE 1 using elongated strip elements rather than conventional round ones and the cellular concept is common to both. The actual degree of sub-division into cells is a function of the propellant distribution system used and is one of the parameters to be considered in the design of the motor.

Referring to FIGURE 8, a modification is shown consisting of a lower motor 38 of the general type referred to in FIGURE 3, but employing dual propellant carrying members as shown in FIGURE 5. The lower motor 38 carries a similar upper motor 39 which may separate in flight and continue on.

In operation, propellant is directed from the propellant carrying member, whether it is a single member for a mono-propellant or partitioned or dual members for fuel and oxidizer propellants, into the continuous or individual thrust chamber assemblies. The propellant is directed selectively by means of the piping and valving shown in some of the figures. Thus, control is obtainable and extremely high thrusts are obtainable using existing known devices which may be tested relatively cheaply. If the device is to be used as a satellite, the propellant carrying members or toroids 10 or their equivalent, may be used as a living quarters once the propellant has been exhausted. Any combination of the arrangements shown in FIGURES 1 through 8 may be employed to obtain a rocket motor of extremely high thrust ranging in the millions of pounds.

While I have hereinbefore described preferred forms of my invention, obviously many modifications and variations of the present invention are possible in the light of the above teachings. It is therefore to be understood that within the scope of the appended claims, the invention may be practiced otherwise than as specifically described.

I claim:

1. A rocket motor comprising, a propellant carrying member in the shape of a modified toroid, at least one thrust chamber assembly extending along a major periphery of the toroid for directing thrust substantially at right angles to the plane of maximum cross section of the toroid, and means connecting the toroid and thrust chamber assembly for selectively directing propellant to said assembly.

2. Apparatus as defined in claim 1 wherein the propellant carrying member is annular and is partitioned into fuel and oxidizer sections.

3. A rocket motor comprising, a propellant carrying member in the shape of a modified toroid, a plurality of combustion chamber assemblies extending along a major periphery of the toroid, plug nozzle means disposed below the combustion chamber assemblies and extending along the same major periphery of the toroid, and means connecting the toroid and combustion chambers for selectively directing propellant to each assembly.

4. Apparatus as defined in claim 3 wherein the propallant carrying member is partitioned into fuel and oxidizer sections.

5. A rocket motor comprising, a propellant carrying member in the shape of a modified toroid, a plurality of combustion chamber assemblies extending along a lower surface of the toroid, a continuous plug nozzle disposed below the combustion chamber assemblies contiguous to the assemblies, and means connecting the toroid and combustion chamber assemblies for selectively directing propellant to each assembly.

6. Apparatus as defined in claim 5 wherein the propellant carrying member is partitioned into fuel and oxidizer sections.

7. A rocket motor comprising, an annular propellant carrying member in the shape of a modified toroid, a plurality of combustion chamber assemblies supported from and extending around a major periphery of the toroid and disposed to exhaust from a common place, a continuous plug nozzle disposed below and common to each combustion chamber assembly to receive the exhaust therefrom and direct the thrust substantially perpendicular to the plane of maximum cross section of the toroid, and means connecting the toroid and combustion chambers for selectively directing propellant to each assembly.

8. Apparatus as described in claim 7 wherein the annular member is partitioned into fuel and oxidizer sections.

9. A cellular rocket motor comprising, propellant carrying means in the shape of a modified toroid, a plurality of combustion chamber assemblies peripherally spaced along a major periphery of the toroid for directing thrust substantially at right angles to the plane of maximum cross-section of the toroid, said assemblies including cellular strip injectors, nozzle means disposed below the assemblies to receive the exhaust therefrom and produce thrust and means connecting the toroid and combustion chambers for selectively directing propellant to each assembly.

10. A rocket motor comprising, a pair of closed concentric annular members in the shape of modified toroids for carrying fuel and oxidizer respectively, a plurality of combustion chamber assemblies depending from one of said members and connected to said members, said combustion chamber assemblies extending around a major periphery of the toroids and disposed to exhaust from a common place, a nozzle disposed below and common to each combustion chamber assembly to receive the exhaust therefrom and direct the thrust substantially perpendicular to the plane of maximum cross section of the toroids, and means connecting the toroids and combustion chambers for selectively directing propellant to each assembly.

References Cited in the file of this patent

UNITED STATES PATENTS

| | | |
|---|---|---|
| 2,183,312 | Goddard | Dec. 12, 1939 |
| 2,396,567 | Goddard | Mar. 12, 1946 |
| 2,412,134 | Eksergian | Dec. 3, 1946 |

(Other references on following page)

UNITED STATES PATENTS

| | | | |
|---|---|---|---|
| 2,489,953 | Burney | Nov. 29, | 1949 |
| 2,563,023 | Goddard | Aug. 7, | 1951 |
| 2,627,231 | Kraemer | Feb. 3, | 1953 |
| 2,683,962 | Griffith | July 20, | 1954 |
| 2,700,337 | Cumming | Jan. 25, | 1955 |
| 2,703,962 | Olson | Mar. 15, | 1955 |
| 2,714,999 | Thieblot et al. | Aug. 9, | 1955 |
| 2,753,687 | Wissley et al. | July 10, | 1956 |
| 2,818,914 | Thomann et al. | Jan. 7, | 1958 |

FOREIGN PATENTS

| | | |
|---|---|---|
| 488,860 | Italy | Jan. 8, 1954 |
| 633,336 | Great Britain | Dec. 12, 1949 |
| 1,036,205 | France | Sept. 4, 1953 |

OTHER REFERENCES

Jet Propulsion, September 1957, vol. 27, No. 9, pp. 1002–1004 relied on.

Popular Mechanics, March 1932, pp. 458–464 relied on.

Aviation Age, November 1956, pp. 58–63 relied on.